LOCKING MECHANISM FOR CLAMPING A DIE ON AN EXTRUDER
Filed Oct. 14, 1966 3 Sheets-Sheet 1
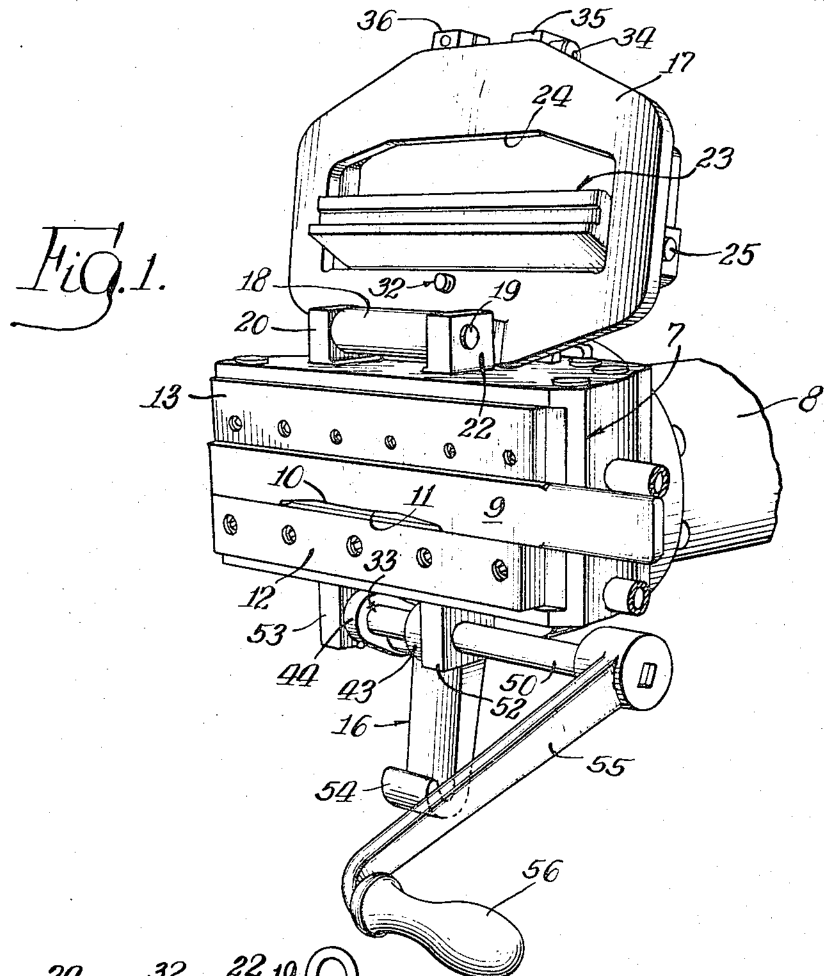
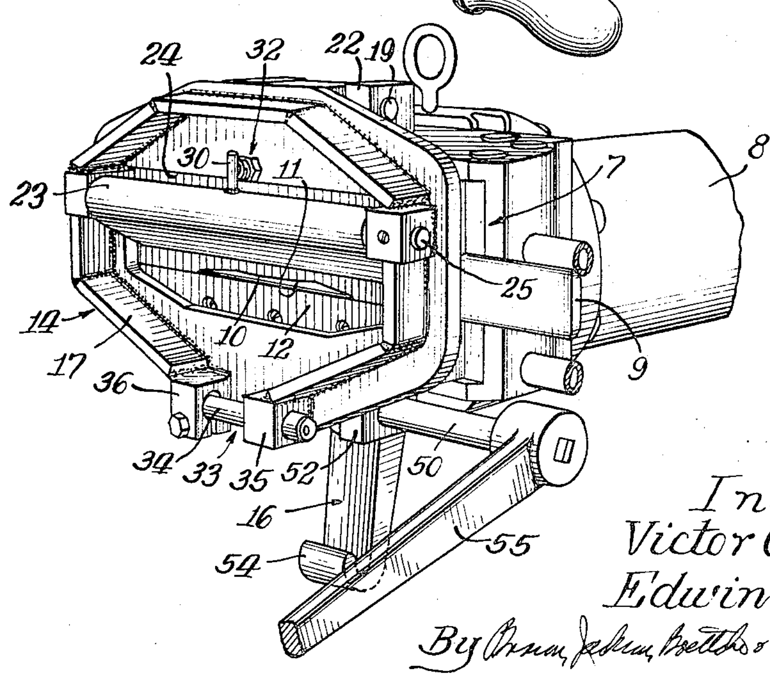
Inventors:-
Victor C. Vigansky,
Edwin E. Mallory,
By [signature] Attys.

LOCKING MECHANISM FOR CLAMPING A DIE ON AN EXTRUDER
Filed Oct. 14, 1966 3 Sheets-Sheet 2
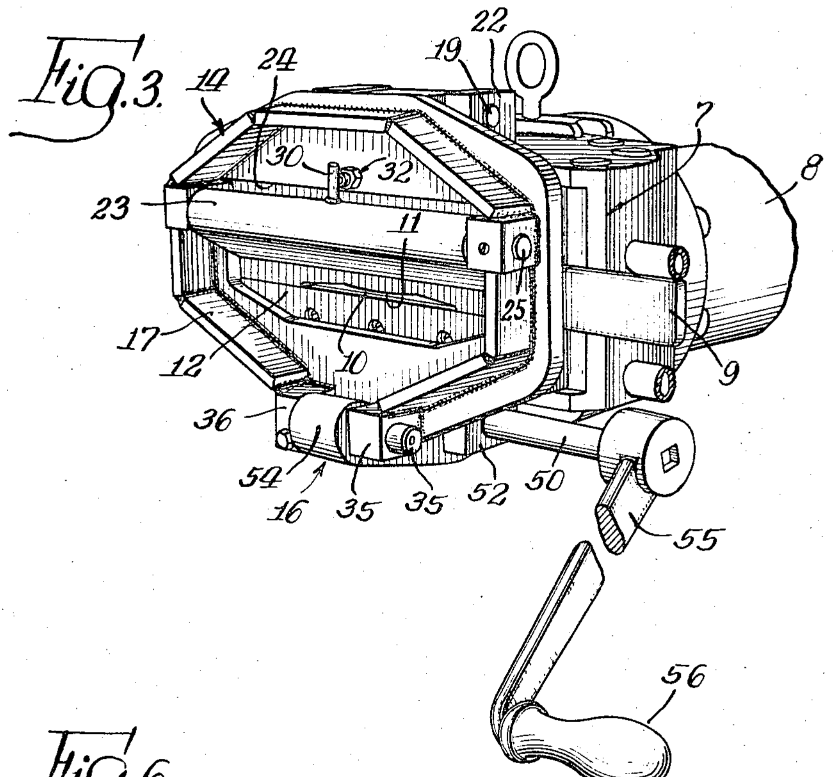
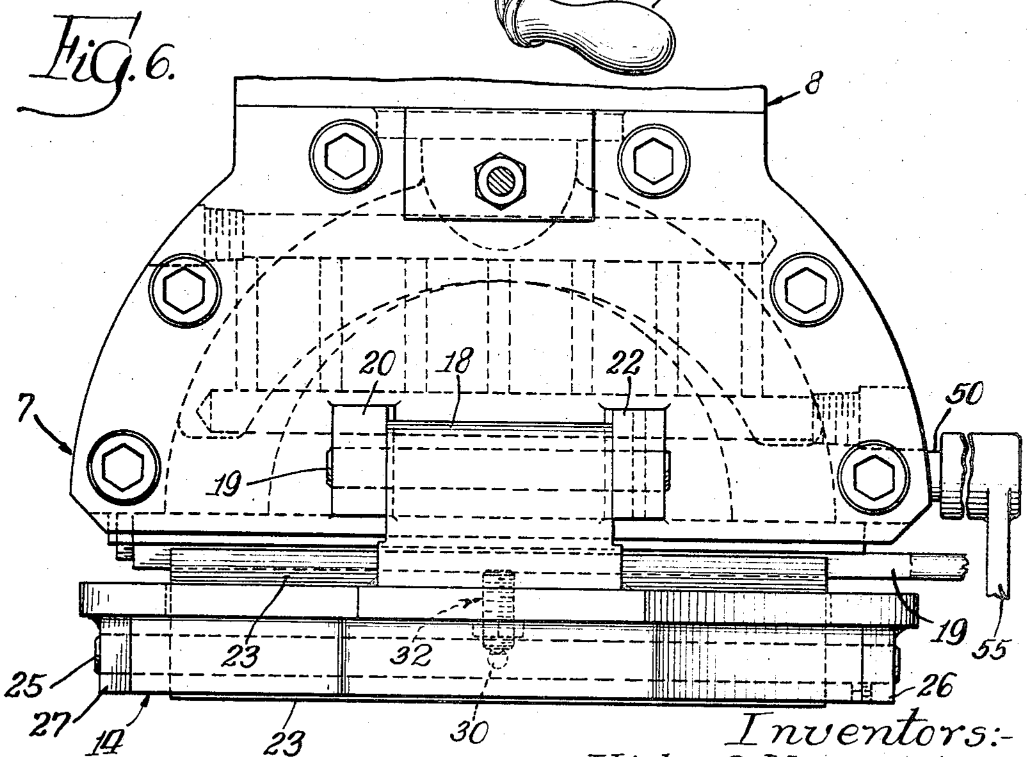
Inventors:-
Victor C. Vigansky,
Edwin E. Mallory,
By Brown, Jackson, Boettcher & Dienner Attys.

LOCKING MECHANISM FOR CLAMPING A DIE ON AN EXTRUDER
Filed Oct. 14, 1966 
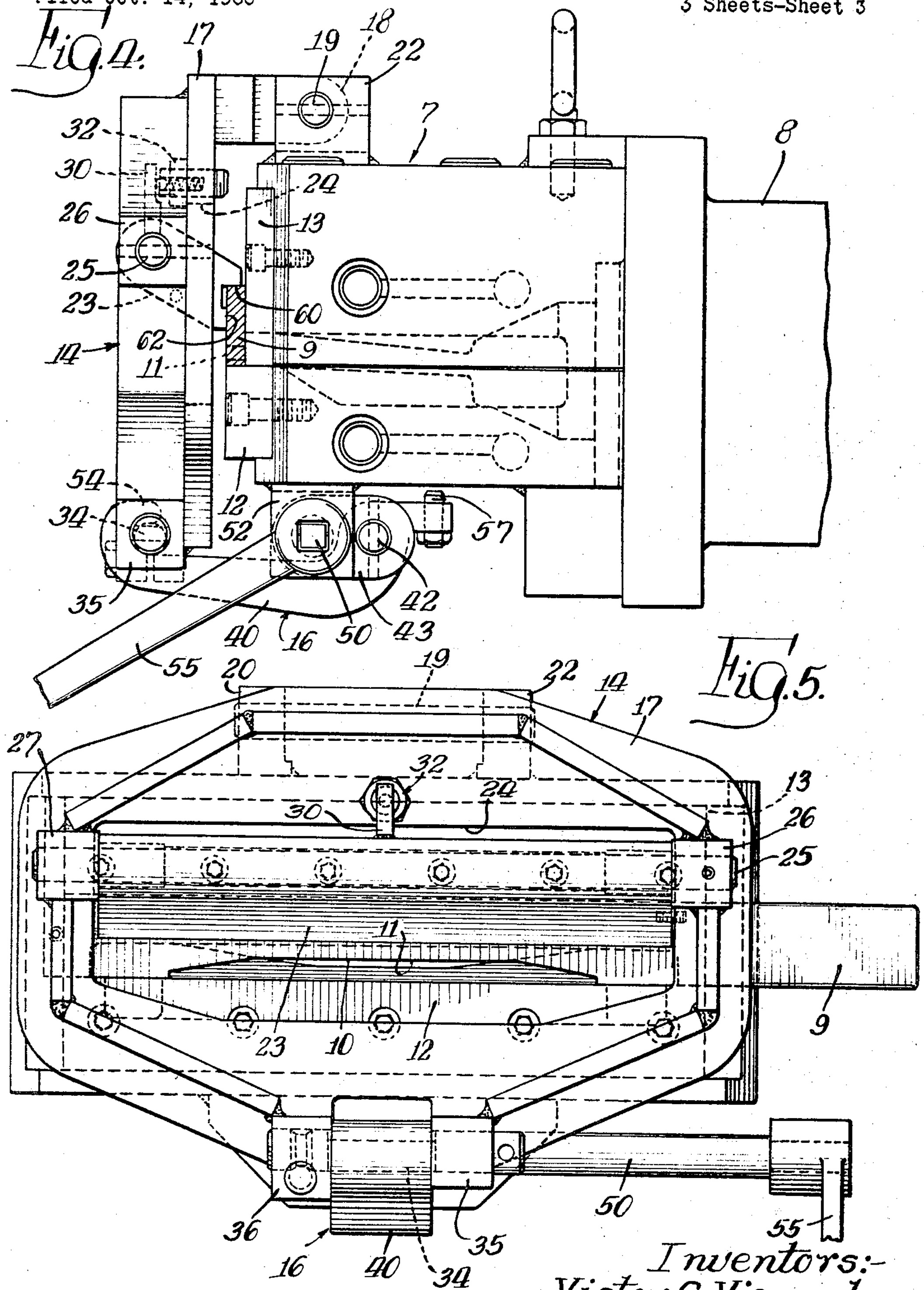

United States Patent Office 3,407,441
Patented Oct. 29, 1968

3,407,441
LOCKING MECHANISM FOR CLAMPING A DIE ON AN EXTRUDER

Victor C. Vigansky, Buchanan, and Edwin E. Mallory, Niles, Mich., assignors to National-Standard Company, Niles, Mich., a corporation of Delaware Filed Oct. 14, 1966, Ser. No. 586,848
5 Claims. (Cl. 18—12)

ABSTRACT OF THE DISCLOSURE

Locking mechanism for use with an extruder having a pivoted gate for movement toward and away from the discharge end of the extruder for supporting a die clamping plate means to retain a die in position at the discharge opening of the extruder, and latch mechanism easily and quickly actuatable by a crank arm and including components adapted to be disposed in overcentered relation to provide high pressure engagement of the die clamping plate means with a die at the die opening in the latched position of the latch mechanism.

The present invention relates to a locking mechanism for an extruder to effect the quick mounting and removal of a die for the extruder.

The locking mechanism of the present invention has particular utility for the mounting and removal of a die for an extruder of a character for delivering a continuous strip of tire tread stock material for the fabrication of treads for application to pneumatic tires. An extruder of the character last noted, as is known, includes internal apparatus for heating and conveying macerated tire tread material which is fed through a die at the outlet of the extruder. The die is of appropriate configuration to form the discharged material into the desired cross-sectional configuration for a tire tread. In the tire art today, tire treads vary widely in cross sectional configuration and dimensions and in order to afford use of the extruder to form strip tread stock material into a variety of desired cross sectional configurations, an appropriate die must be assembled with the extruder for each of such configurations.

In presently known extruder and die assemblies, the dies are held in position by a plurality of bolts threaded into the extruder. Thus, in the removal of one die and the insertion of another die, considerable time is required in removing and replacing the die retaining bolts. This is undesirable for it requires considerable shut down time in making a die change and interrupts substantially continuous operation of the extruder.

Accordingly, it is the purpose of the present invention to provide a locking mechanism for an extruder in which a die change may be rapidly and easily accomplished.

It is proposed according to the present invention to provide a locking mechanism for an extruder embodying movable gate means mounted on the extruder for positioning into first and second positions in juxtaposition of and away from the discharge end of the extruder, respectively. The gate means provides for the support of die clamping plate means for engaging a die which is supported at the discharge end of the extruder by die supporting plate means thereat in the aforementioned first position of the gate means. With the gate means in the position last noted, the locking mechanism of the invention further includes latch means including a latch for engaging latch engageable means of the swinging gate means to bias the gate means in a direction to effect pressure engagement of the die clamping plate means with the die to firmly retain the latter in position with respect to the outlet of the extruder. Preferably the latch means includes means for effecting over-centering latch engagement of the latch with the latch engageable means of the gate means to retain the parts in locked position.

Accordingly, it is an object of the invention to provide locking mechanism including movable gate means and die clamping plate means therefore which may be readily positioned to locking and un-locking positions with respect to a die at the discharge end of an extruder, and which gate means may be latched in its locking position and thus provide for the rapid and easy removal and replacement of dies at the outlet of an extruder.

The above and other objects and advantages of the invention will appear from the following detailed description of a preferred embodiment of the invention in connection with the accompanying drawings in which FIGURE 1 is a perspective view of the locking mechanism of the present invention mounted at the outlet end of an extruder and with the parts of the locking mechanism being in a position for effecting the placement and removal of a die for the extruder;

FIGURE 2 is a perspective view of the locking mechanism shown in FIGURE 1 and with swinging gate means of the locking mechanism in position for retaining a die in position at the outlet end of the extruder;

FIGURE 3 is a view along the lines of FIGURE 2 showing the swinging gate means latched in position for firmly retaining the die member in position at the outlet end of the extruder;

FIGURE 4 is a side elevational view of the discharge end of the extruder and the locking mechanism of the present invention shown in FIGURES 1, 2 and 3;

FIGURE 5 is a front elevational view of the locking mechanism illustrated in FIGURE 4; and FIGURE 6 is a plan view of the discharge end of the extruder and locking mechanism of the present invention as shown in FIGURES 4 and 5.

Referring now to FIGURE 1 of the drawings, the locking mechanism of the present invention is shown incorporated at the discharge end 7 of a conventional and known extruder 8. The extruder 8 as previously indicated may be of any presently known construction for heating and macerating tire tread stock material for discharge through a die, as shown at 9, which provides for forming a continuous strip of the tire tread material conforming to the cross-sectional configuration of opening 10 formed between die edge 11 and the upper surface of a die supporting plate member 12 mounted at the discharge or outlet of the extruder. As best seen in FIGURES 1 and 4, the discharge end of the extruder has mounted thereon an end plate member 13 which together with the plate member 12 define die plate supporting means in which the upper edge of plate member 12 supports the bottom edge of the die 9 with the rear face of the die in engagement with the front surface of plate member 13.

The locking mechanism of the present invention comprises gate means, indicated generally at 14, and latch means indicated generally at 16. The gate means 14 comprises a frame member 17 which is pivotally mounted on a horizontal axis at and above the discharge end of the extruder by means of a cylindrical bearing 18 secured as by welding to the frame member 17 and through which bearing 18 a shaft 19 extends. The opposite ends of shaft 19 are supported in a pair of bearing blocks 20 and 22 secured as by welding to the upper surface at the discharge end of the extruder. The gate means 17 is thus supported for swinging or pivotal movement about the axis of shaft 19 from the position shown in FIGURE 1 to the position shown in FIGURE 2 and in which the position shown in FIGURE 2 may be considered to be a first position in juxtaposition of the discharge end of the extruder, and the position of the gate means 14 shown in FIGURE 1 being a second position disposed away from the discharge end of the extruder.

The gate means 14 further comprises die clamping plate means 23 lying in an enlarged central opening 24 of frame member 17 and pivotally mounted about an axis parallel with the axis of shaft 19 on a shaft 25 journalled at its opposite ends in bosses 26 and 27 of frame member 17. A stud 30 is fixed to die clamping plate means 23 for engaging the plunger of a spring biased plunger assembly 32 for maintaining the die clamping plate means 23 in a slightly yielding predetermined position with respect to frame member 17 for purposes hereinafter described.

The gate means 14 further comprises, as best seen in FIGURE 2, latch engageable means 33, intermediate the ends of the edge of frame member 17 opposite its pivotal mounting about shaft 19, comprising an eccentric shaft 34 supported in boss portions 35 and 36 integral with frame member 17. The eccentric shaft may be rotated to a desired position for suitable engagement with a latch of latch means 16 hereinafter described in detail.

The latch means 16, as best seen in FIGURES 1 and 4 comprises a latch 40 which latch 40 is pivotally mounted at its inner end about a pin 42 secured at the opposite ends of a pair of spaced lever members 43 and 44 defining lever means keyed to a crank shaft 50. The crank shaft 50 extends transversely of the discharge end of the extruder and is supported for rotation in a pair of spaced apart bearing blocks 52 and 53 secured to the bottom surface as by welding to the extruder head and below the discharge opening and die 9. The latch member 40 at its inner end carries an adjustable stop pin 57 for engaging the bottom surface of the extruder for limiting counterclockwise movement of the latch member 40 as viewed in FIGURE 4. The latch member 40 at its outer end is provided with a nose portion 54 which is adapted to have engagement with the eccentric pin 34 of the gate means 14. A crank handle 55 is suitably secured or keyed to the outer end of shaft 50 and is provided with a handle 56 to effect rotation of the crank shaft 50.

In the mechanism above described and with the gate means 14 in its position disposed away from the discharge end of the conveyor as shown in FIGURE 1, the die 9 may be readily placed or removed from the outlet or discharge end of the extruder. When an appropriate die 9 has been arranged at the discharge outlet of the extruder, the swinging gate means 14 may be manually rotated about the axis of the shaft 19 to dispose the gate means 14 in the position shown in FIGURE 2 of the drawings. In this position of the parts, as best seen in FIGURE 4, surface portions 60 and 62 of die clamp plate means 23 engage, respectively, an upper surface portion of the die 9 and the front upper surface portion of the die 9. The aforementioned stud 30 and spring biased plunger means 32 as before mentioned provides for the predetermined positioning of the die clamping plate means 23 and yielding movement of the latter so that when the gate means 14 is swung to the position shown in FIGURE 1 to the position shown in FIGURE 2 the surface portions 60 and 62 may be brought into pressure engagement with portions of the upper surface and front face of the die 9 by the latch means 16.

With the gate means 14 in the position shown in FIGURE 2, the crank 55 may be rotated in a clockwise direction as viewed in FIGURE 4, to dispose the nose portion 54 of the latch 40 over the pin 34 of the latch engageable means 33 of the gate means 14. Upon engagement of the nose portion as aforedescribed, the crank handle 55 may then be rotated in a counterclockwise direction with the nose 54 then biasing the gate means 14 in a counterclockwise direction about the axis of shaft 19 to provide pressure engagement of the die plate clamping means with the upper edge portion of the die and the front surface portion of the die through the aforedescribed pressure engaging surfaces of the die clamp means 23. Preferably the axis of the pin 42 for the inner end of the latch 40 is positioned relative to the axis of the shaft 50 to provide an overcenter relationship so that upon the counterclockwise movement of the crank arm 55 as aforedescribed provides an overcenter relation for maintaining the parts in locked position. After the extruder has been operated to provide the desired strip tread material afforded by the die 9 and when another die is to be substituted for the die 9, simple movement of the crank arm 55 effects the ready release of the gate means 14 to enable swinging of the gate means from the position shown in FIGURE 2 to the position shown in FIGURE 1 so that the die in the machine may be removed and another die inserted in its place. Thereafter, the locking mechanism is locked up as aforedescribed.

While there has been shown and described a preferred embodiment of the invention, it will be understood that various modifications and rearrangements may be made therein without departing from the spirit and scope of the invention.

The invention claimed is:

1. Locking mechanism for use with an extruder having die supporting means for supporting a die at the discharge outlet of said extruder comprising gate means mounted on said extruder for movement to first and second positions in juxtaposition of and away from said die supporting means, respectively, die clamping plate means mounted in said gate means for engaging a die at the discharge opening of the extruder at said first position of said gate means, latch engageable means carried by said gate means, and latch means comprising a crank shaft mounted for rotation on a fixed axis at the discharge outlet of said extruder, lever means keyed to said crank shaft, a latch member pivotally mounted on a fixed axis at one end of said lever means, said latch member at its other end having a nose portion for engaging said latch engageable means, and a crank arm connected with said crank shaft for rotating the latter in one direction to effect engagement of said nose portion of said latch member with said latch engageable means in said first position of said gate means, and thereafter in the other direction to dispose the axis of rotation of said crank shaft and the pivot axis of said latch member in overcentered relation for maintaining said die clamping plate means in pressure engagement with the die at said first position of said gate means.

2. The locking mechanism of claim 1 characterized by said die clamping plate means having first and second surface portions engaging front and upper surface portions of the die to maintain the die in pressure engagement with said extruder at said discharge opening in the overcentered relation of the axis of rotation of said crank shaft and the pivot axis of said latch member.

3. The locking mechanism of claim 1 characterized by the provision of eccentric adjusting means for adjusting the position of said latch engageable means of said gate means.

4. The locking mechanism of claim 2 characterized by the provision of eccentric adjusting means for adjusting the position of said latch engageable means of said gate means.

5. Locking mechanism for use with an extruder having die supporting means for supporting a die at the discharge outlet of said extruder comprising gate means pivotally mounted on said extruder about an axis lying above and extending transversely of the discharge end of said extruder for movement to first and second positions in juxtaposition of and away from said die supporting means, respectively, die clamping plate means pivotally mounted in said gate means on an axis extending parallel with the axis of said gate means, said die clamping plate means having first and second surface portions for engaging front and upper surface portions of a die at said outlet of said extruder in said first position of said gate means, latch engageable means carried by said gate means, latch means movably mounted on said extruder for engaging said latch engageable means in said first position of said gate means for holding said die clamping plate means in engagement with the die at the outlet of said extruder, said latch means including means for effecting overcenter engagement of said latch with said latch engageable means of said gate means to retain said latch means engaged with said latch engageable means, and spring means between said gate means and said die clamping plate means for yieldingly positioning the latter relative to said gate means to engage said first and second surface portions thereof with said front and upper surface portions of said die.

References Cited

UNITED STATES PATENTS

| | | | |
|---|---|---|---|
| 1,427,831 | 9/1922 | McCool | 18—12 XR |
| 1,841,491 | 1/1932 | Maynard | 18—43 |
| 1,931,872 | 10/1933 | Lodge | 18—12 XR |
| 2,035,247 | 3/1936 | Royle | 18—12 XR |
| 2,514,211 | 7/1950 | Carlson | 18—12 |
| 2,543,679 | 2/1951 | Van Riper | 18—12 |
| 2,560,022 | 7/1951 | Formaz | 18—12 |
| 2,981,977 | 5/1961 | Fannen | 18—43 |

FOREIGN PATENTS

| | | |
|---|---|---|
| 765,383 | 1/1957 | Great Britain. |
| 1,068,456 | 11/1959 | Germany. |

WILLIAM J. STEPHENSON, *Primary Examiner.*